(12) United States Patent
Kamppuri et al.

(10) Patent No.: US 11,817,759 B2
(45) Date of Patent: Nov. 14, 2023

(54) ELECTRIC MACHINE

(71) Applicant: ABB Schweiz AG, Baden (CH)

(72) Inventors: Janne Kamppuri, Helsinki (FI); Samu Aarnivuo, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 25 days.

(21) Appl. No.: 17/647,115

(22) Filed: Jan. 5, 2022

(65) Prior Publication Data
US 2022/0224185 A1 Jul. 14, 2022

(30) Foreign Application Priority Data
Jan. 11, 2021 (EP) ..................................... 21150880

(51) Int. Cl.
| | |
|---|---|
| *H02K 5/16* | (2006.01) |
| *H02K 5/167* | (2006.01) |
| *F16C 17/26* | (2006.01) |
| *H02K 7/08* | (2006.01) |

(52) U.S. Cl.
CPC ........... *H02K 5/1672* (2013.01); *F16C 17/26* (2013.01); *H02K 7/083* (2013.01); *F16C 2380/26* (2013.01)

(58) Field of Classification Search
CPC ............ H02K 7/00; H02K 7/08; H02K 7/083; H02K 5/00; H02K 5/15; H02K 5/16; H02K 5/161; H02K 5/1672; F16C 17/26
See application file for complete search history.

(56) References Cited

U.S. PATENT DOCUMENTS

| | | | | |
|---|---|---|---|---|
| 3,786,289 A | * | 1/1974 | Baclawski | ........... H02K 5/1672 310/90 |
| 2018/0248422 A1 | | 8/2018 | Helander et al. | |

FOREIGN PATENT DOCUMENTS

| | | |
|---|---|---|
| CN | 201466941 U | 5/2010 |
| DE | 102017106788 A1 | 10/2017 |
| JP | S5663256 U | 5/1981 |

OTHER PUBLICATIONS

European Search Report; Application No. EP 21 15 0880; dated Jun. 11, 2021; 2 Pages.

* cited by examiner

*Primary Examiner* — Tran N Nguyen
(74) *Attorney, Agent, or Firm* — WHITMYER IP GROUP LLC

(57) ABSTRACT

The electric machine includes a shaft, a rotor, a stator, and a frame. The shaft is supported rotatably on the frame with an axially locating sleeve bearing at each axial end of the shaft. The axial play limiting the axial movement of the shaft is greater in one of the two axially locating sleeve bearings compared to the axial play in the other of the two axially locating sleeve bearings. An axial movement of the shaft is limited only by the bearing with the smaller axial play during normal operational circumstances and by both bearings during exceptional events, the bearing with the greater axial play reducing the axial load of the first bearing in such exceptional events.

3 Claims, 6 Drawing Sheets

ELECTRIC MACHINE

TECHNICAL FIELD

The present invention relates to an electric machine.

BACKGROUND

An electric machine may be provided with a rotor, a stator surrounding the rotor, and a frame surrounding the stator.

The shaft of the electric machine may be rotatably supported on the frame with bearings at the drive end and at the non-drive end of the electric machine. The bearings may be sleeve bearings, whereby one of the sleeve bearings of the electric machine may be an axially locating sleeve bearing and the other sleeve bearing of the electric machine may be a normal sleeve bearing without any axial locating capacity. The axially locating sleeve bearing may be provided at the drive end of the electric machine.

There are also actual axial bearings comprising a disc attached to the shaft and support elements acting on opposite surfaces of the disc radially outside the outer surface of the shaft. The support elements may be supported in a bearing frame. An actual axial bearing is, however, an expensive component and therefore used only in critical applications.

An earthquake causes ground acceleration which stresses the electric machines. The biggest problem in earthquakes is to hold the rotor in its position when the earthquake happens.

SUMMARY

An object of the present invention is to achieve an improved electric machine.

The electric machine according to the invention is defined in the claims.

The electric machine comprises
  a shaft,
  a rotor being supported on the shaft,
  a stator surrounding the rotor,
  a frame surrounding the stator,
  a bearing at a drive end and a bearing at a non-drive end of the electric machine for supporting the shaft rotatably on the frame, both bearings being sleeve bearings.

The electric machine is characterized in that
  both bearings are axially locating sleeve bearings, the axial play limiting the axial movement of the shaft being greater in one of the two axially locating sleeve bearings compared to the axial play in the other of the two axially locating sleeve bearings so that an axial movement of the shaft is limited only by the bearing with the smaller axial play during normal operational circumstances and by both bearings during exceptional events such as during seismic events, the bearing with the greater axial play reducing the axial load of the first bearing in such exceptional events.

The invention provides an effective way of dealing with the problem of keeping the rotor in a predetermined axial position during a seismic event. The bearing with the greater axial play does not take part in the limiting of the axial movement of the rotor during normal operational conditions. The bearing with the greater axial play limits the axial movement of the rotor only during exceptional seismic events, e.g. during earthquakes. The bearing with the greater axial play may take 50% of the total axial shock load during an earthquake after an initial threshold force has been reached.

This may be achieved by arranging an axially locating sleeve bearing at each end of the electric machine. The axial play of one of the axially locating sleeve bearings may be greater than the axial play of the other axially locating sleeve bearing. The larger axial play may be dimensioned so that expected thermal expansions do not activate the axial positioning of the axially locating sleeve bearing with the greater play i.e., they are handled by the axial positioning of the axially locating sleeve bearing with the smaller axial play. The shock load during an earthquake may be estimated to be in the order of 800 kN. The axial deformations in the axially locating sleeve bearing with the smaller axial play may be several millimetres during an earthquake.

The axially locating sleeve bearing is an axial load carrying bearing.

The electric machine may be an electric motor or an electric generator.

The electric machine may be a large electric machine. The shaft height of the electric machine may be in the range of 1120 to 2000 mm. The electric machine may be a high voltage electric machine. The electric machine may be a rib cooled electric machine. The output power of the electric machine may be in the range of 1 to 25 MW. The voltage of the electric machine may be up to 11.5 kV.

BRIEF DESCRIPTION OF THE DRAWINGS

In the following the invention will be described in greater detail by means of preferred embodiments with reference to the attached drawings, in which.

DETAILED DESCRIPTION

Figure 1A:
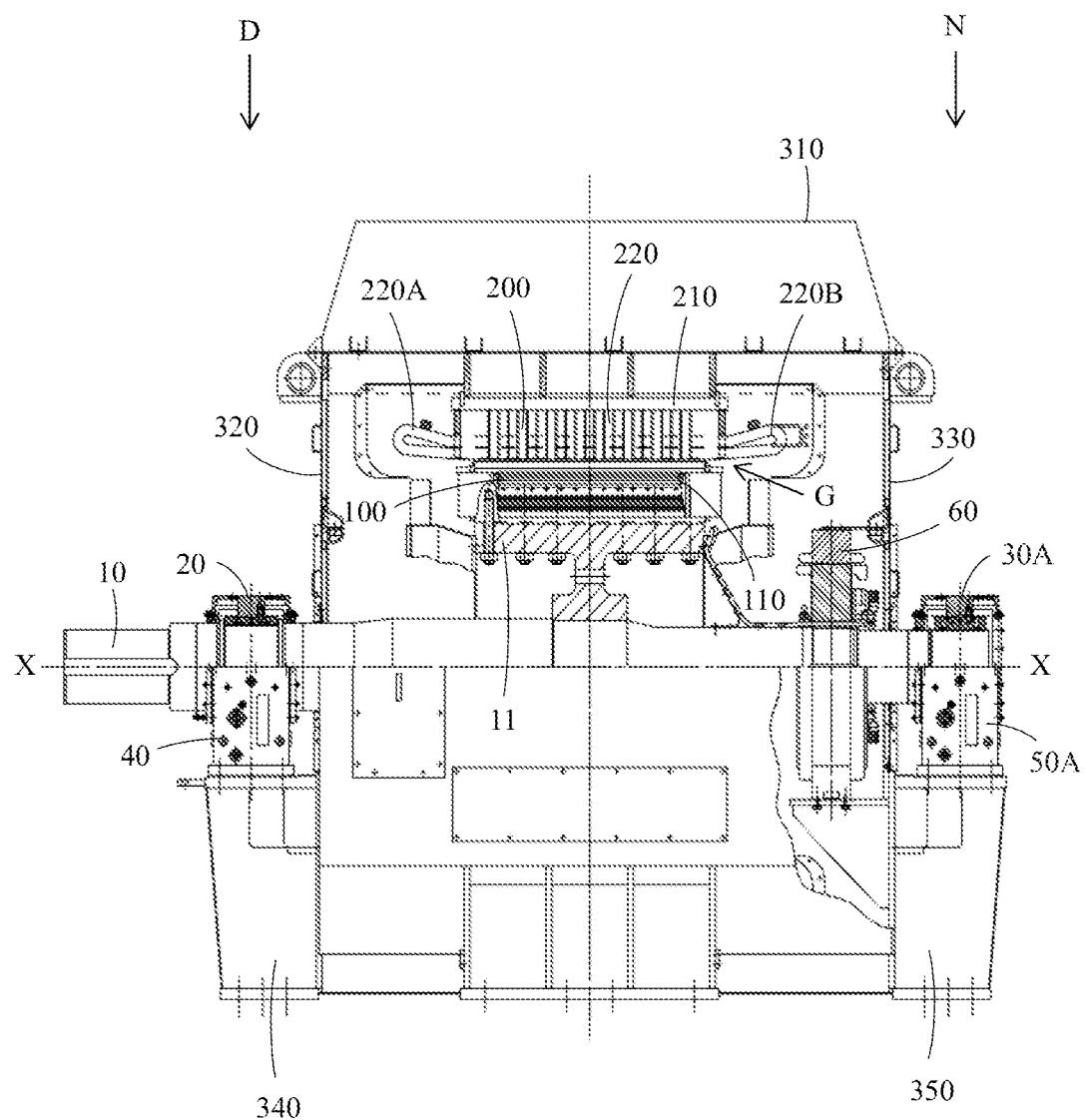
FIG. 1A shows an axial cross section of an electric machine according to prior art.

FIG. 1A shows an axial cross section of an electric machine according to prior art.

The electric machine may comprise a shaft 10, a rotor 100, a stator 200, and a frame 300.

The shaft 10 may be rotatably supported with bearings 20, 30A at a drive end D and at a non-drive end N of the electric machine. The bearings 20, 30A may be positioned in bearing housings 40, 50A arranged outside the end plates 320, 330 of the frame 300. A first one 320 of the two end plates 320, 330 may be attached to a first axial end of the frame 300 at the drive end D of the electric machine. A second one 330 of the two end plates 320, 330 may be attached to a second axial end of the frame 300 at the non-drive end N of the electric machine. The first axial end of the frame 300 is opposite to the second axial end of the frame 300. The shaft 10 may rotate around an axis X-X of rotation. The drive end D of the electric machine is to the left in the figure and the non-drive end N of the electric machine is to the right in the figure.

The rotor 100 may be fitted on a cylindrical middle portion 11 supported on the shaft 10 so that the rotor 100 rotates in synchronism with the shaft 10. The rotor 100 may comprise a rotor winding 110.

The stator 200 may surround the rotor 100. The stator 200 may be attached to the frame 300. The frame 300 may surround the stator 200. The stator 200 and the frame 300 are both stationary.

The stator 200 may comprise a stator core 210 and a stator winding 220. The stator winding 220 may be positioned in axial grooves arranged on an inner surface of the stator core 210. The stator winding 220 may further comprise end portions 220A, 220B extending outwards from opposite axial ends of the stator core 210.

The exciter 60 of the electric machine is positioned on the shaft 10 within the frame 300 of the electric machine.

There is an air gap G between the inner perimeter of the stator core 210 and the outer perimeter of the rotor 100.

The frame 300 may comprise a cover 310 covering the electric machine from the top of the electric machine. The bearings 20, 30A are pedestal mounted in this embodiment. The bearing housings 40, 50A are supported on support blocks 340, 350. The support blocks 340, 350 may be supported on the floor on the site.

First axial air passages may be formed between the outer perimeter of the rotor 100 and the inner perimeter of the stator 200. Second axial air channels may be formed between the outer perimeter of the stator core 210 and the frame 300. The stator core 210 and the rotor 100 may have a laminated structure formed of a pack of sheets.

The first bearing 20 on the drive side of the electric machine may be an axially locating sleeve bearing. The second bearing 30A on the non-drive side of the electric machine may be a normal sleeve bearing. This is a normal prior art way of dealing with the axial forces in electric machines. Only one of the bearings, normally the drive end bearing 20, is an axially locating sleeve bearing being able to withstand axial forces for keeping the shaft 10 axially in a correct position during normal operational conditions.

Figure 1B:
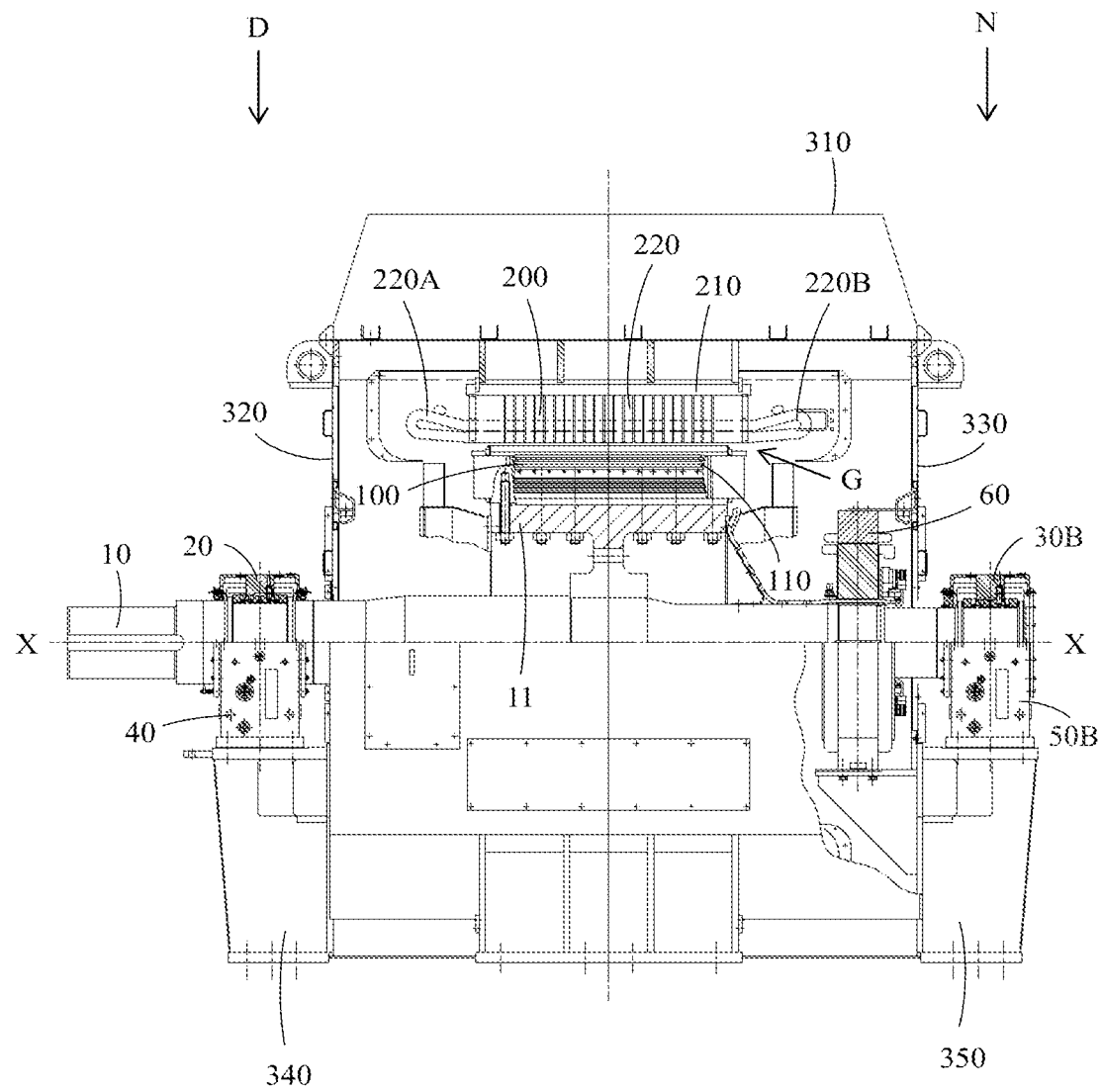
FIG. 1B shows an axial cross-section of an electric machine according to an embodiment of the present invention.

FIG. 1B shows an axial cross section of an electric machine according to an embodiment of the present invention.

The electric machine may comprise a shaft 10, a rotor 100, a stator 200, and a frame 300.

The shaft 10 may be rotatably supported with bearings 20, 30B at a drive end D and at a non-drive end N of the electric machine. The bearings 20, 30B may be positioned in bearing housings 40, 50B arranged outside the end plates 320, 330 of the frame 300. A first one 320 of the two end plates 320, 330 may be attached to a first axial end of the frame 300 at the drive end D of the electric machine. A second one 330 of the two end plates 320, 330 may be attached to a second axial end of the frame 300 at the non-drive end N of the electric machine. The first axial end of the frame 300 is opposite to the second axial end of the frame 300. The shaft 10 may rotate around an axis X-X of rotation. The drive end D of the electric machine is to the left in the figure and the non-drive end N of the electric machine is to the right in the figure.

The rotor 100 may be fitted on a cylindrical middle portion 11 supported on the shaft 10 so that the rotor 100 rotates in synchronism with the shaft 10. The rotor 100 may comprise a rotor winding 110.

The stator 200 may surround the rotor 100. The stator 200 may be attached to the frame 300. The frame 300 may surround the stator 200. The stator 200 and the frame 300 are both stationary.

The stator 200 may comprise a stator core 210 and a stator winding 220. The stator winding 220 may be positioned in axial grooves arranged on an inner surface of the stator core 210. The stator winding 220 may further comprise end portions 220A, 220B extending outwards from opposite axial ends of the stator core 210.

The exciter 60 of the electric machine is positioned on the shaft 10 within the frame 300 of the electric machine.

There is an air gap G between the inner perimeter of the stator core 210 and the outer perimeter of the rotor 100.

The frame 300 may comprise a cover 310 covering the electric machine from the top of the electric machine. The bearings 20, 30B are pedestal mounted in this embodiment. The bearing housings 40, 50B are supported on support blocks 340, 350. The support blocks 340, 350 may be supported on the floor on the site.

First axial air passages may be formed between the outer perimeter of the rotor 100 and the inner perimeter of the stator 200. Second axial air channels may be formed between the outer perimeter of the stator core 210 and the frame 300. The stator core 210 and the rotor 100 may have a laminated structure formed of a pack of sheets.

In an embodiment of the present invention both the first bearing 20 on the drive side of the electric machine and the second bearing 30B on the non-drive side of the electric machine are axially locating sleeve bearings.

In an embodiment of the present invention both the first bearing 20 and the second bearing 30B are axially locating sleeve bearings, the axial play limiting the axial movement of the shaft 10 being greater in one 30B of the two axially locating sleeve bearings 20, 30B compared to the axial play in the other 20 of the two axially locating sleeve bearings 20, 30B so that an axial movement of the shaft 10 is limited only by the first bearing 20 with the smaller axial play during normal operational circumstances and by both bearings 20, 30B during exceptional events, the second bearing 30B with the greater axial play reducing the axial load of the first bearing 20 in such exceptional events.

When referring to the term "exceptional events", in this application, it is meant to refer to any exceptional event taking place near the electric machine installation not foreseen or not considered as typical for the electric machine installation, such as earthquakes, seismic events, military explosions, rock blasting, pile-driving or other similar exceptional events effective to the electric machine installation.

When referring to the term "normal operational circumstances", in this application, it is meant to refer to any normal operational circumstances that are not considered to fall under the term "exceptional events".

In the present application the two axially locating sleeve bearings 20, 30B are dimensioned so that in "normal operational circumstances" the first bearing 20 with the smaller axial play limits the axial movement of the shaft 10 as an axially locating sleeve bearing 20 and only when an initial threshold force of an "exceptional event" is reached both of the two axially locating sleeve bearings 20, 30B limit the axial movement of the shaft 10.

Figure 2:
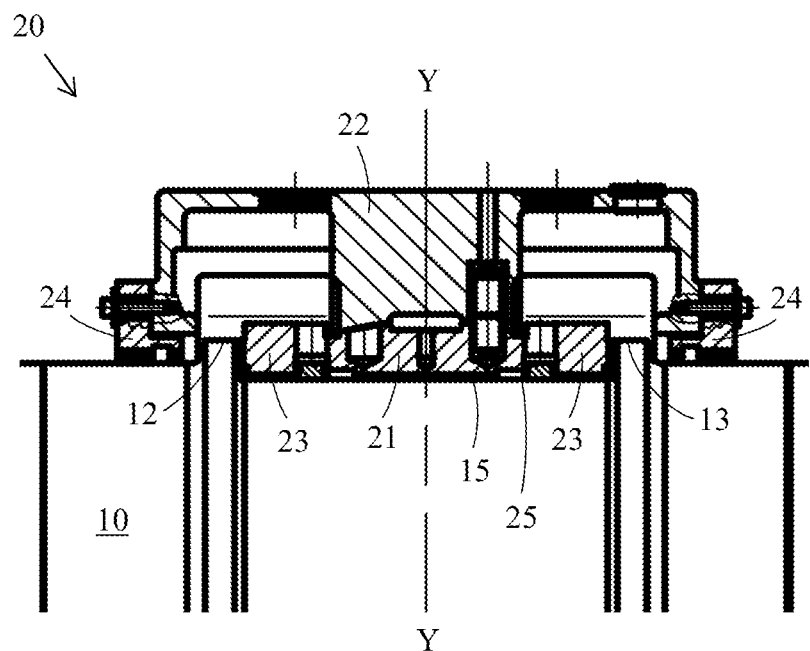
FIG. 2 shows an axially locating sleeve bearing according to an embodiment of the present invention.

FIG. 2 shows an axially locating sleeve bearing according to an embodiment of the present invention.

The bearing on the drive side in the electric machine in FIG. 1B is an axially locating sleeve bearing 20. A vertical centre line Y-Y of the bearing is shown in the figure.

The shaft 10 comprises collars 12, 13 extending radially outwards from the outer surface of the shaft 10. The collars 12, 13 rotate with the shaft 10. The shaft 10 comprises further a portion 15 with a smaller diameter between the two collars 12, 13. The bearing 20 comprises a bearing frame 22. A spherical seat 21 is positioned in the bearing frame 22 between the collars 12, 13. A sleeve 25 surrounding the shaft 10 and forming the bearing surface between the shaft 10 and the bearing 20 is supported in the seat 21. Each collar 12, 13 comprises an outer and an inner radial surface. The bearing frame 22 comprises first bearing supports 23 seating against the inner radial surfaces of the collars 12, 13. The bearing frame 22 comprises further second bearing supports 24 seating against the outer radial surfaces of the collars 12, 13. The bearing frame 22 is supported in the bearing housing 40 which is not shown in the figure. The shaft 10 becomes thus supported in the axial direction between the bearing supports 23, 24 in the bearing frame 22. The shaft 10 is further rotatably supported in the radial direction by the sleeve 25.

There is an axial play between the rotating radial surfaces of the collars 12, 13 of the shaft 10 and the corresponding opposite stationary radial surfaces in the bearing 20. The play allows thus a small movement of the shaft 10 in the axial direction. The maximum axial play of the rotor 100 may be ±8 mm. The axial movement of the shaft 10 should thus in all events be limited to a range being smaller than this maximum play ±8 mm.

Figure 3A:
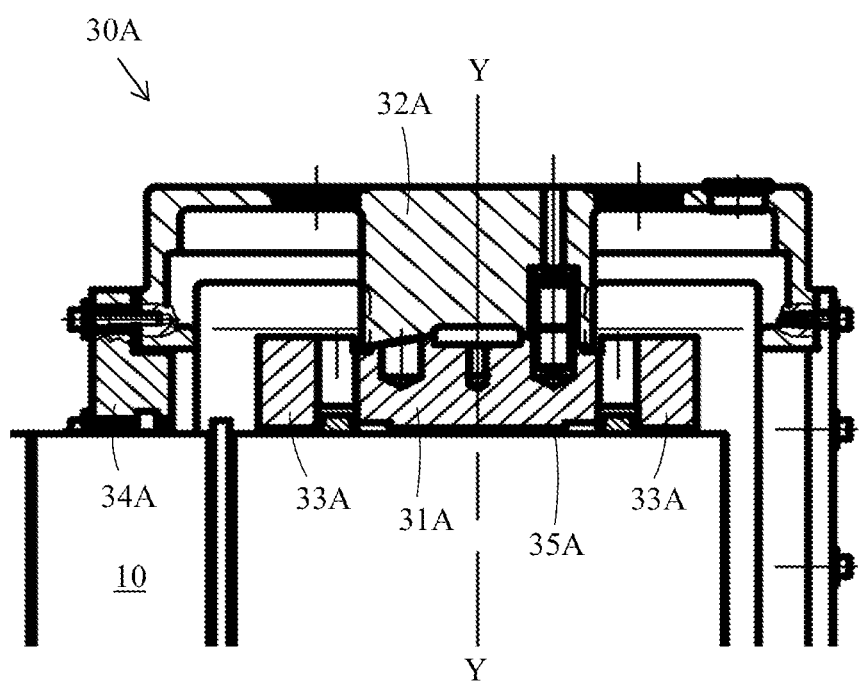
FIG. 3A shows a normal sleeve bearing with no axial locating according to prior art.

FIG. 3A shows a normal sleeve bearing with no axial locating according to prior art.

The bearing on the non-drive side in the electric machine in FIG. 1A is a normal sleeve bearing 30A. A vertical centre line Y-Y of the bearing is shown in the figure.

There are no collars on the shaft 10 in a normal sleeve bearing. The outer surface of the shaft 10 is straight i.e., has a uniform diameter in the area of the sleeve bearing 30A. The bearing 30A comprises a bearing frame 32A. A spherical seat 31A is positioned in the bearing frame 32A. A sleeve 35A surrounding the shaft 10 and forming the bearing surface between the shaft 10 and the bearing 30A is supported in the seat 31A. The bearing frame 32A comprises first bearing supports 33A forming the outermost portions of the bearing frame 32A. The bearing frame 32A is supported in the bearing housing 50A which is not shown in the figure. The shaft 10 is thus rotatably supported only in the radial direction through the sleeve 35A.

Figure 3B:
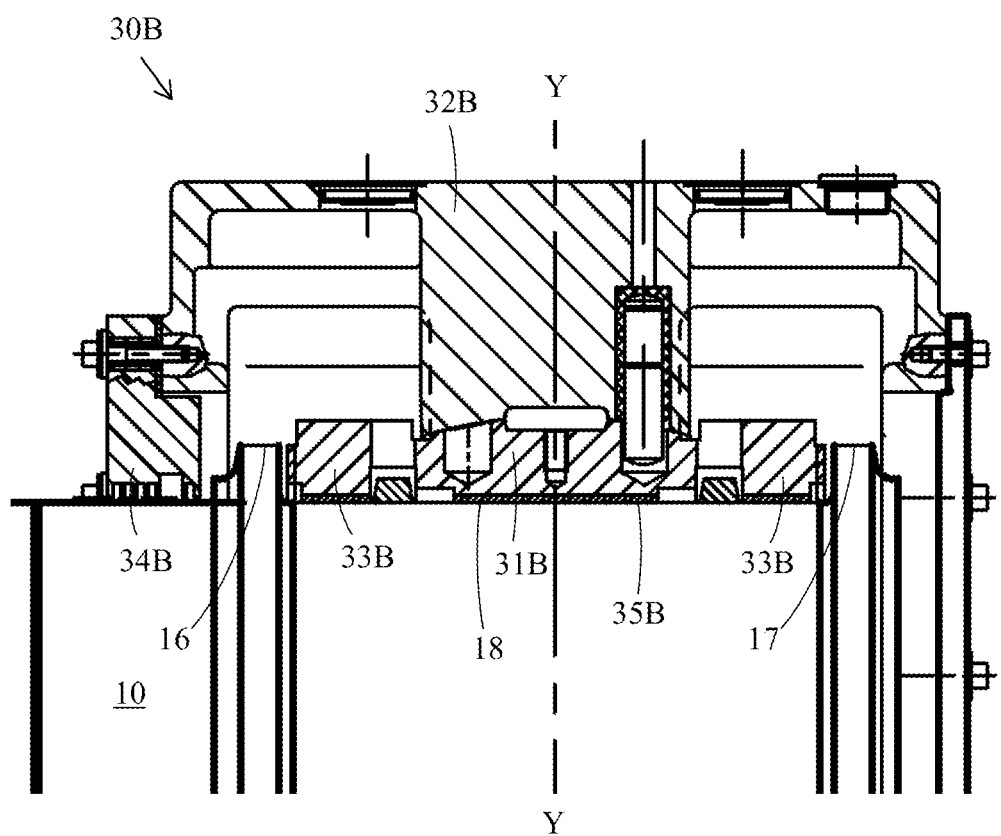
FIG. 3B shows an axially locating sleeve bearing on the non-drive side according to an embodiment of the present invention.

FIG. 3B shows an axially locating sleeve bearing on the non-drive side according to an embodiment of the present invention.

The bearing on the non-drive side in the electric machine in FIG. 1B is an axially locating sleeve bearing 30B. A vertical centre line Y-Y of the bearing is shown in the figure.

The shaft 10 comprises collars 16, 17 extending radially outwards from the outer surface of the shaft 10. The collars 16, 17 rotate with the shaft 10. The shaft 10 comprises further a portion 18 with a smaller diameter between the two collars 16, 17. The bearing 30B comprises a bearing frame 32B. A spherical seat 31B is positioned in the bearing frame 32B between the collars 16, 17. A sleeve 35B surrounding the shaft 10 and forming the bearing surface between the shaft 10 and the bearing 30B is supported in the seat 31B. Each collar 16, 17 comprises an outer and an inner radial surface. The bearing frame 32B comprises first bearing supports 33B seating against the inner radial surfaces of the collars 16, 17. The bearing frame 32B comprises further second bearing support 34B seating against the outer radial surface of the collar 16. The bearing frame 32B is supported in the bearing housing 50B which is not shown in the figure. The shaft 10 becomes thus supported in the axial direction between the bearing supports 33B, 34B in the bearing frame 22. The shaft 10 is further rotatably supported in the radial direction by the sleeve 35B.

Figure 4:
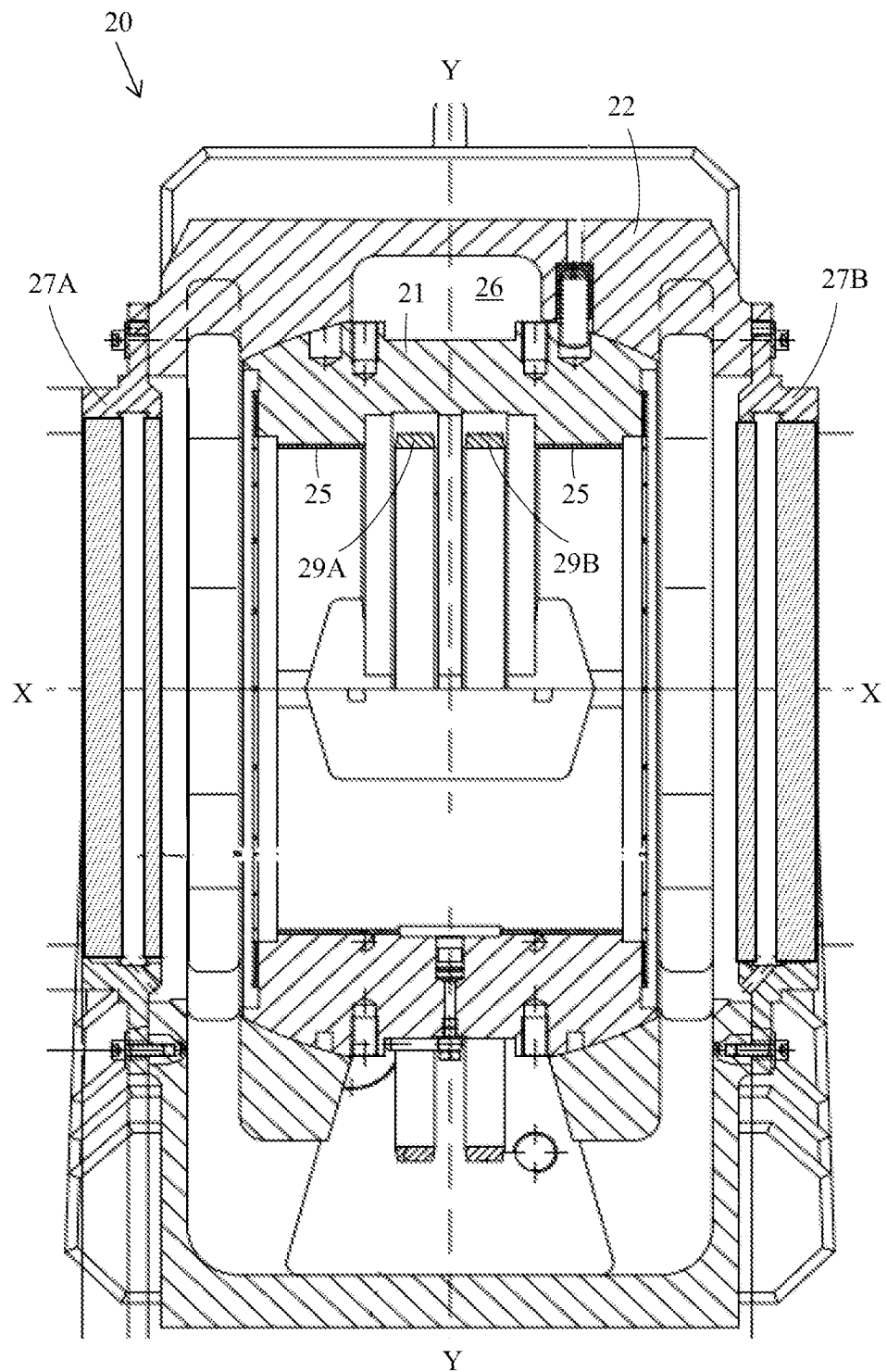
FIG. 4 shows a pedestal mounted sleeve bearing of an electric machine according to an embodiment of the present invention.

FIG. 4 shows a pedestal mounted sleeve bearing of an electric machine according to an embodiment of the present invention.

The bearing 20 comprises an axial centre line X-X and a vertical centre line Y-Y.

The spherical seat 21 seats in the bearing frame 22. The sleeve 25 is supported in the spherical seat 21. The spherical seat 21 and the sleeve 25 may be provided with oil passages 29A, 29B for supplying oil from an oil chamber 26 to the bearing surface. The bearing 20 comprises further two seals 27A, 27B positioned at an axial distance from each other on opposite axial sides of the sleeve 25. Each seal 27A, 27B acts against an outer surface of the shaft 10. The seals 27A, 27B prevent penetration of the bearing lubricant along the shaft 10 outside the bearing 20.

Figure 5:
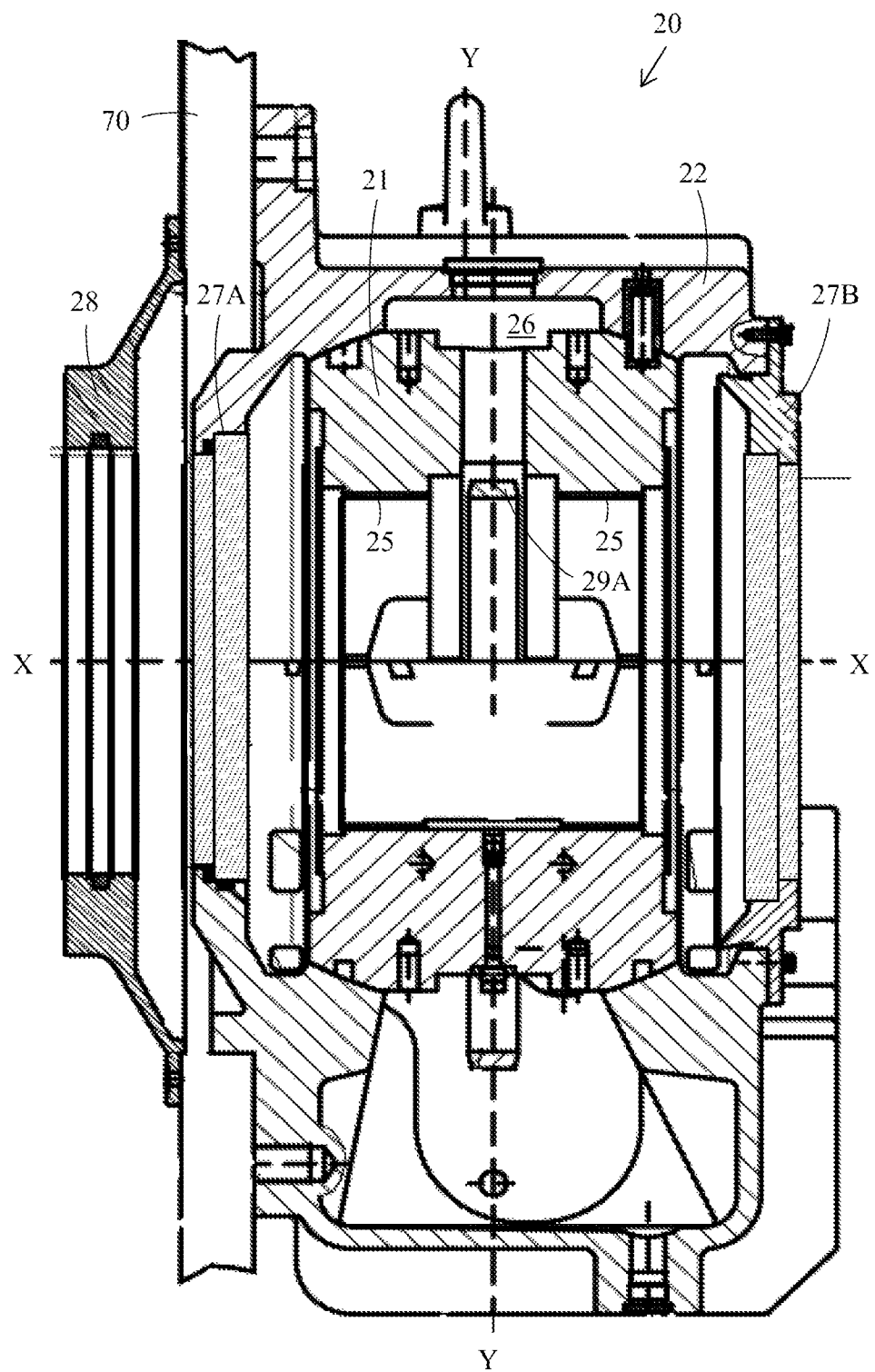
FIG. 5 shows a flange mounted sleeve bearing of an electric machine according to an embodiment of the present invention.

FIG. 5 shows a flange mounted sleeve bearing of an electric machine according to an embodiment of the present invention.

The bearing 20 comprises an axial centre line X-X and a vertical centre line Y-Y.

The frame 22 of the bearing 20 is attached to a flange 70 in this embodiment. The spherical seat 21 seats in the bearing frame 22. The sleeve 25 is supported in the spherical seat 21. The spherical seat 21 and the sleeve 25 may be provided with an oil passage 29A for supplying oil from an oil chamber 26 to the bearing surface. The bearing 20 comprises further two seals 27A, 27B positioned at an axial distance from each other on opposite axial sides of the sleeve 25. Each seal 27A, 27B acts against an outer surface of the shaft 10. The seals 27A, 27B prevent penetration of the bearing lubricant along the shaft 10 outside the bearing 20. There is a further a machine seal 28 preventing air circulating within the electric machine from acting on the actual seals 27A, 27B.

The rotor core and the stator core may have a laminated structure being made of electrical steel sheets.

The invention is not limited to the examples described above but may vary within the scope of the claims.

The invention claimed is:

1. An electric machine comprises
    a shaft,
    a rotor being supported on the shaft,
    a stator surrounding the rotor,
    a frame surrounding the stator,
    a bearing at a drive end and a bearing at a non-drive end of the electric machine for supporting the shaft rotatably on the frame, both bearings being axially locating sleeve bearings,
  wherein,
    an axial play limiting an axial movement of the shaft is greater in one of the two axially locating sleeve bearings compared to an axial play in the other of the two axially locating sleeve bearings so that the axial movement of the shaft is limited only by the bearing with the smaller axial play during normal operational circumstances and by both bearings during exceptional events, wherein the bearing with the greater axial play reduces an axial load of the bearing with the smaller axial play in such exceptional events;
    wherein each axially location sleeve bearing comprises a sleeve bearing portion supporting the shaft only in a radial direction and an axial bearing portion supporting the shaft only in an axial direction, the axial bearing portion of each axially locating sleeve bearing being formed of opposite radial side surfaces acting between the shaft and the respective axially locating sleeve bearing.

2. The electric machine as claimed in claim 1, wherein the axially locating sleeve bearing with the greater axial play is dimensioned to take substantially 50% of the axial load after an initial threshold force has been reached.

3. The electric machine as claimed in claim 1, wherein the exceptional events include a seismic event, and wherein the axial movement of the shaft is limited by both bearings during said seismic event.

\* \* \* \* \*